United States Patent
Guenaltay et al.

(10) Patent No.: US 9,061,922 B2
(45) Date of Patent: Jun. 23, 2015

(54) METHOD FOR PROCESSING WASTEWATER AND EXHAUST GAS CONDENSATES FROM THE POLYMERIZATION OF VINYL ACETATE AND ETHYLENE IN AN AQUEOUS MEDIUM

(75) Inventors: Mehmet Guenaltay, Emmering (DE); Dorothee Guenaltay, legal representative, Emmerting (DE); Hans-Peter Weitzel, Reischach (DE); Bernhard Eckl, Burghausen (DE)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 14/117,480

(22) PCT Filed: May 31, 2012

(86) PCT No.: PCT/EP2012/060288
§ 371 (c)(1),
(2), (4) Date: Nov. 13, 2013

(87) PCT Pub. No.: WO2012/168138
PCT Pub. Date: Dec. 13, 2012

(65) Prior Publication Data
US 2014/0251139 A1 Sep. 11, 2014

(30) Foreign Application Priority Data
Jun. 6, 2011 (DE) .......................... 10 2011 077 010

(51) Int. Cl.
*B01D 19/00* (2006.01)
*C02F 1/20* (2006.01)
(Continued)

(52) U.S. Cl.
CPC ... *C02F 1/20* (2013.01); *B01D 3/00* (2013.01); *C02F 1/00* (2013.01); *C02F 1/04* (2013.01); *C02F 2103/38* (2013.01); *C08F 6/003* (2013.01); *C08F 6/006* (2013.01); *C08J 11/02* (2013.01)

(58) Field of Classification Search
None
See application file for complete search history.

(56) References Cited

U.S. PATENT DOCUMENTS 3,359,187 A    12/1967   Eberhardt
3,509,115 A *  4/1970    French .......................... 528/481
(Continued)

FOREIGN PATENT DOCUMENTS

CN    101346401 A    1/2009
DE     2132362 A1    1/1972
(Continued)

OTHER PUBLICATIONS

English language patent abstract corresponding to DE 44 25 918 C2, Feb. 12, 2014.

*Primary Examiner* — Duane Smith
*Assistant Examiner* — Phillip Shao
(74) *Attorney, Agent, or Firm* — RatnerPrestia

(57) ABSTRACT

A method for processing wastewater and exhaust gas condensates from the polymerization of vinyl acetate and ethylene and optionally other comonomers in an aqueous medium by suspension or emulsion polymerization employs relieving pressure after completion of the polymerization of the polymerization batch and discharging the polymer dispersion. During the relieving, the gaseous phase is removed by means of a compressor. Optionally, the gaseous phase occurring during stripping is removed by the compressor and cooled by one or more heat exchangers before entry into the compressor. The liquid phases occurring in the compressor and optionally in the heat exchanger are separated from the gaseous phase and the liquid phases are given to a rectification column, and separated into a vinyl acetate monomer phase and a wastewater phase, and the vinyl acetate monomer phase is resupplied to polymerization.

6 Claims, 1 Drawing Sheet

(51) Int. Cl.
  *B01D 3/00* (2006.01)
  *C02F 1/00* (2006.01)
  *C02F 1/04* (2006.01)
  *C08F 6/00* (2006.01)
  *C08J 11/02* (2006.01)
  *C02F 103/38* (2006.01)

(56) References Cited

U.S. PATENT DOCUMENTS

| | | | |
|---|---|---|---|
| 3,738,915 A | 6/1973 | di Fiore et al. | |
| 3,905,875 A | 9/1975 | Kronig et al. | |
| 4,091,200 A * | 5/1978 | Vandegaer | 528/495 |
| 4,217,431 A * | 8/1980 | Zacher et al. | 526/68 |
| 5,208,367 A | 5/1993 | Ou | |
| 6,809,174 B2 * | 10/2004 | Weitzel et al. | 528/501 |
| 2008/0269434 A1 * | 10/2008 | Guenaltay et al. | 526/68 |

FOREIGN PATENT DOCUMENTS

| | | |
|---|---|---|
| DE | 4425918 C2 | 10/1996 |
| DE | 102005061576 A1 | 6/2007 |
| WO | WO 2007/074075 | 7/2007 |

* cited by examiner

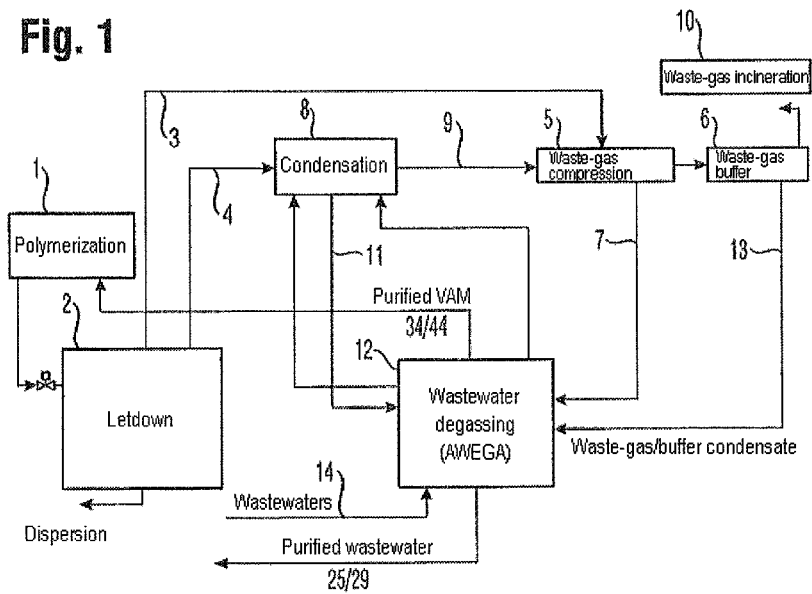
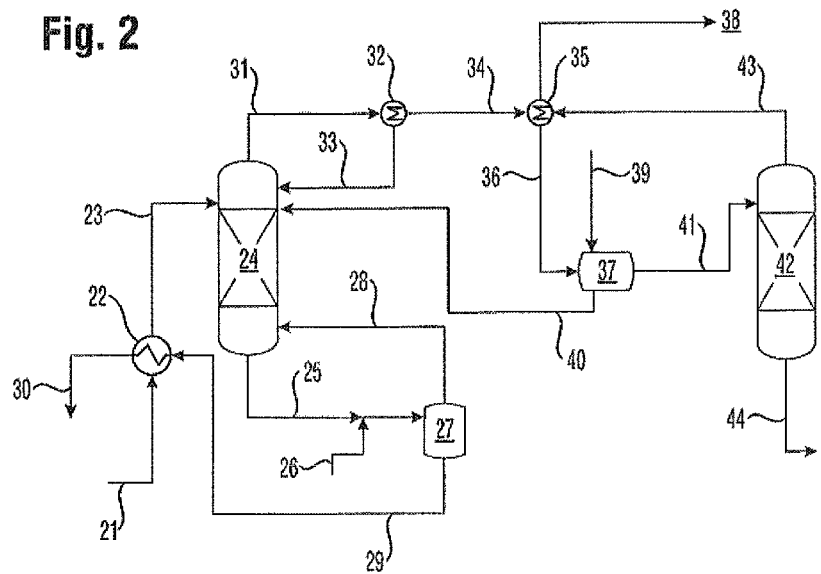

METHOD FOR PROCESSING WASTEWATER AND EXHAUST GAS CONDENSATES FROM THE POLYMERIZATION OF VINYL ACETATE AND ETHYLENE IN AN AQUEOUS MEDIUM

CROSS REFERENCE TO RELATED APPLICATIONS

This application is the national phase filing of international patent application No. PCT/EP2012/060288, filed 31 May 2012, and claims priority of German application number 10 2011 077 010.0, filed 6 Jun. 2011, the entireties of which applications are incorporated herein by reference.

FIELD OF THE INVENTION

The invention relates to a method for processing wastewaters and waste-gas condensates from the polymerization of vinyl acetate and ethylene in an aqueous medium, with recovery of residual, unpolymerized monomers.

BACKGROUND OF THE INVENTION

Aqueous polymer dispersions or aqueous polymer lattices based on vinyl acetate and ethylene are conventionally prepared by the suspension polymerization process, more particularly by the emulsion polymerization process. In their preparation, the polymerization is not taken to complete conversion, for economic reasons. There remain residual monomer fractions, which are removed by means of chemical methods such as postpolymerization and/or of physical methods such as stripping methods, in which a stripping gas is passed through the aqueous dispersion. Environmental and economic reasons dictate that the attendant waste gases and wastewaters shall be purified and that the monomer fraction removed in the course of degassing and, optionally, stripping, more particularly the vinyl acetate fraction, shall be recovered and, where appropriate, re-used in the polymerization.

Known from DE 4425918 C2 is a method for recovering unreacted vinyl acetate monomer (VAM) after polymerization reactions from the steam that escapes during stripping, and in this method the vinyl acetate is isolated, by extraction in an extraction column, from the process water from a water ring pump which takes off the gas phase during stripping of the dispersion.

While this method does recover VAM from the steam that escapes during stripping, the gas stream taken off by the water ring pump, and also the wastewaters obtained in the extraction column, nevertheless still contain residual quantities of VAM.

WO 2007/074075 A1 describes the removal of residual vinyl ester and ethylene monomers, after the end of polymerization, by means of a multistage fractional, very low-temperature condensation. The purification of wastewaters obtained during the polymerization is not described.

SUMMARY OF THE INVENTION

The object, therefore, was to develop a method with which the wastewaters and waste-gas condensates that are obtained in the polymerization of vinyl acetate and ethylene can be purified and with which the residual monomer fraction contained therein can at least partly be recovered.

BRIEF DESCRIPTION OF THE DRAWINGS

FIG. 1 is a schematic representation of process for preparing copolymers of vinyl acetate and ethylene including a method of treating wastewater according to the invention.

FIG. 2 is a schematic representation of a process for performing wastewater degassing at item 12 of FIG. 1 according to the invention.

DETAILED DESCRIPTION OF THE INVENTION

The invention provides a method for processing wastewaters and waste-gas condensates from the polymerization of vinyl acetate and ethylene and optionally further comonomers in an aqueous medium, by the suspension or emulsion polymerization process under a pressure of 5 to 100 bar abs., in which, after the end of the polymerization, the polymerization batch is let down to a pressure of 0.1 to 5 bar abs., and is optionally treated with inert entraining gases (stripping) and the polymer dispersion is drained off, characterized in that A) during letdown the gaseous phase is taken off by means of a compressor, B) the gaseous phase obtained during stripping is optionally taken off by means of the compressor and, before entering the compressor, is cooled by means of one or more heat exchangers, and C) the liquid phases obtained in the compressor and optionally in the heat exchanger are each separated from the gaseous phase, and D) are applied to a rectifying column, and are separated into a vinyl acetate monomer phase and into a wastewater phase, and the vinyl acetate monomer phase is returned to the polymerization.

Vinyl acetate is copolymerized generally in an amount of 30 to 97 wt %, preferably 70 to 95 wt %, based in each case on the overall weight of the monomers.

Ethylene is copolymerized generally in an amount of 1 to 30 wt %, preferably 3 to 15 wt %, based in each case on the overall weight of the monomers.

Suitable further comonomers are those from the group of the vinyl esters of carboxylic acids having 1 to 12 C atoms, bar vinyl acetate; the esters of acrylic acid or methacrylic acid with unbranched or branched alcohols having 1 to 15 C atoms; the vinyl halides such as vinyl chloride; and the olefins, bar ethylene, such as propylene. Preferred vinyl esters are vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, as for example VeoVa9® or VeoVa10® (trade names of the company Momentive). Preferred methacrylic esters or acrylic esters are methyl acrylate, methyl methacrylate, ethyl acrylate, n-butyl acrylate, and 2-ethylhexyl acrylate. These comonomers are copolymerized optionally in an amount of 1 to 40 wt %, based on the overall weight of the monomers.

It is possible if desired for 0.05 to 10 wt %, based on the overall weight of the monomers, of auxiliary monomers to be copolymerized as well. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride, ethylenically unsaturated sulfonic acids and their salts, preferably vinylsulfonic acid, and 2-acrylamido-2-methylpropanesulfonic acid. Other examples are precrosslinking comonomers such as polyethylenically unsaturated comonomers, as for example divinyl adipate, diallyl maleate, allyl methacrylate, or triallyl cyanurate, or postcrosslinking comonomers, as for example acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide, of N-methylolmethacrylamide, and of N-methylolallylcarbamate. Also suitable are epoxide-functional comonomers such as glycidyl methacrylate and glycidyl acrylate. Other examples are silicon-functional comonomers, such as acryloyloxypropyltri(alkoxy)silanes and methacryloyloxypropyltri(alkoxy)-silanes, vinyltrialkoxysilanes, and vinylmethyldialkoxysilanes, with possible examples of alkoxy groups present being methoxy, ethoxy, and ethoxypropylene glycol ether radicals. Mention may also be made of monomers having hydroxyl or CO groups, examples being methacrylic and acrylic hydroxyalkyl esters such as hydroxyethyl, hydroxypropyl, or hydroxybutyl acrylate or methacrylate, and also compounds such as diacetoneacrylamide and acetylacetoxyethyl acrylate or methacrylate.

Preparation takes place by the emulsion polymerization process or by the suspension polymerization process, preferably by the emulsion polymerization process, where the polymerization temperature is in general 40° C. to 100° C., preferably 60° C. to 90° C., and where operation takes place under a pressure of in general 5 to 100 bar abs. The polymerization is initiated with the water-soluble or monomer-soluble initiators, or redox initiator combinations, that are customary for emulsion polymerization or suspension polymerization, respectively. Examples of water-soluble initiators are the sodium, potassium, and ammonium salts of the peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide, and azobisisobutyronitrile. Examples of monomer-soluble initiators are dicetyl peroxydicarbonate, dicyclohexyl peroxydicarbonate, and dibenzoyl peroxide. The stated initiators are used in general in an amount from 0.01 to 0.5 wt %, based on the overall weight of the monomers.

Redox initiators used are combinations of the stated initiators together with reducing agents. Suitable reducing agents are the sulfites and bisulfites of the alkali metals and of ammonium, as for example sodium sulfite, the derivatives of sulfoxylic acid such as zinc or alkali metal formaldehydesulfoxylates, as for example sodium hydroxymethanesulfinate, and (iso)ascorbic acid. The amount of reducing agent is preferably 0.01 to 0.5 wt %, based on the overall weight of the monomers.

To control the molecular weight it is possible during the polymerization to use regulator substances (chain transfer agents). If chain transfer agents are used, they are employed typically in amounts between 0.01 to 5.0 wt %, based on the monomers to be polymerized, and are metered in separately or else in the form of premixes with other reaction components.

Examples of such agents are n-dodecyl mercaptan, tert-dodecyl mercaptan, mercaptopropionic acid, methyl mercaptopropionate, isopropanol, and acetaldehyde. It is preferred not to use any regulator substances.

Suitable protective colloids are partially hydrolyzed polyvinyl alcohols; polyvinylpyrrolidones; polysaccharides in water-soluble form such as starches (amylose and amylopectin), celluloses and their carboxymethyl, methyl, hydroxyethyl, and hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids, and their water-soluble copolymers; melamine-formaldehyde sulfonates, naphthalene-formaldehyde sulfonates, and styrene-maleic acid and vinyl ether-maleic acid copolymers.

Partially or fully hydrolyzed polyvinyl alcohols are preferred. Particularly preferred are partially hydrolyzed polyvinyl alcohols having a degree of hydrolysis of 80 to 95 mol % and a Höppler viscosity in 4% strength aqueous solution of 1 to 30 mPas (Höppler method at 20° C., DIN 53015). The polyvinyl alcohols are added during the polymerization, generally in an amount of in total 1 to 20 wt %, based on the overall weight of the monomers.

Polymerization in the method of the invention may also take place in the presence of emulsifiers, in which case the amounts of emulsifier are generally 1 to 5 wt %, based on the monomer amount. Suitable emulsifiers include anionic, cationic, and nonionic emulsifiers, examples being anionic surfactants, such as alkyl sulfates having a chain length of 8 to 18 C atoms, alkyl or alkylaryl ether sulfates with 8 to 18 C atoms in the hydrophobic radical and up to 40 ethylene oxide or propylene oxide units, alkylsulfonates or alkylarylsulfonates having 8 to 18 C atoms, esters and monoesters of sulfosuccinic acid with monohydric alcohols or alkylphenols, or nonionic surfactants such as alkyl polyglycol ethers or alkylaryl polyglycol ethers having 8 to 40 ethylene oxide units.

The polymerization may be carried out in a batch process, a semibatch process, or a continuous process. The monomers here may be included in their entirety in the initial charge, metered in in their entirety, or included in fractions in the initial charge, with the remainder being metered in after the polymerization has been initiated. The metered feeds may be carried out separately (in space and in time), or the components to be metered in may be metered all or in part in pre-emulsified form.

The polymerization is taken generally to a conversion of 95 wt %, preferably to a conversion of 95 to 99 wt %, of the monomers which are liquid under polymerization conditions. The polymerization mixture is subsequently let down to a pressure of 0.1 to 5.0 bar abs., preferably of 0.1 to 1.0 bar abs. For this purpose, generally speaking, the polymerization mixture is transferred from the polymerization reactor 1 into a reactor 2 (letdown vessel) that is under corresponding pressure. In the case of discontinuous operation (batch or semibatch mode), letdown takes place after the end of polymerization. In the case of continuous polymerization, the polymerization mixture is transferred continuously into the letdown vessel 2.

Transport takes place by virtue of the pressure difference between polymerization reactor 1 and letdown vessel 2. The pressure difference is preferably from 0.5 to 5 bar. If, in the course of reactor emptying, the pressure difference decreases to a point where the emptying rate falls below the limit of operating economics, inert gas can be introduced, by injection of nitrogen, for example, to maintain or increase the admission pressure in the polymerization reactor 1.

Optionally, employing known techniques, postpolymerization may be performed in the letdown vessel 2, as for example by postpolymerization initiated with redox catalyst.

The volatile residual monomer fraction is optionally removed (stripping) subsequently by passing inert entraining gases such as air, nitrogen, or, preferably, steam over or, preferably, through the aqueous polymerization mixture, in a way of which the skilled person is aware. Generally speaking, stripping is conducted under the absolute pressure in the letdown vessel 2 that corresponds to the boiling point of the water at the polymerization mixture temperature prevailing in the letdown vessel 2. Stripping takes place preferably at a temperature of 50 to 80° C. under a pressure of 0.1 to 0.5 bar abs.

The method of the invention is elucidated in more detail in FIG. 1:

On letdown of the polymerization batch there is a phase separation between the polymer dispersion (liquid phase) and a gaseous phase which comprises inert gas, monomers not fully converted in the polymerization (primarily vinyl acetate and ethylene), and also byproducts from the polymerization (examples being acetaldehyde, ethyl acetate, and tert-butanol). The gaseous phase 3 obtained in the letdown is taken off via a compressor 5.

The gaseous phase 4 obtained during optional stripping comprises generally steam and the monomer fraction not converted in the reaction, more particularly vinyl acetate monomer and ethylene, and also byproducts obtained in the polymerization, such as acetaldehyde or ethyl acetate, and is also taken off via the compressor 5. Before entering the compressor 5, the gaseous phase 4 from the stripping operation is supplied to one or more series-connected heat exchangers (condensers) 8. The gaseous phase is cooled to a temperature at which the vinyl ester monomers and water, and also any ethyl acetate, acetaldehyde, and tert-butanol, undergo condensation, and essentially only ethylene and inert gas fractions remain in the gas phase. Cooling takes place preferably, by heat exchange, to a temperature of 5 to 25° C., more preferably 5 to 20° C., in each case at the preferred pressure level of 0.1 to 1.0 bar abs.

The compressor 5 is preferably a liquid ring compressor, more preferably a liquid ring compressor operated with water (water ring pump). It is also possible, optionally, for two or more compressors to be used, which in that case are preferably connected in parallel. In the compressor 5, the gas stream 3, the gas phase taken off during letdown, and optionally the gas stream 9, the uncondensable gases resulting from the stripping operation, are compressed to a pressure level of preferably 1.1 to 1.5 bar abs., and these compressed gases, preferably via a waste-gas buffer vessel 6, are either worked up for recovery of the ethylene fraction, or passed to waste-gas incineration 10.

The condensate 11 obtained in the course of cooling in the heat exchanger unit 8, and generally being a mixture of water and organic compounds (generally vinyl acetate, ethyl acetate, acetaldehyde, and tert-butanol), is supplied to a wastewater degassing unit (AWEGA) 12, which as a key component comprises a rectifying column 24.

The condensates 7 which condense out from the gas phase following compression in the compressor 5 are likewise supplied to the AWEGA 12. In one preferred embodiment, the condensates obtained during compression are taken off between compressor 5 and waste-gas buffer 6 and are supplied to the wastewater purification unit 12. Condensates 13 obtained in the waste-gas buffer 6 are preferably likewise supplied to the wastewater degassing unit 12. The wastewaters obtained during operation of the compressor 5, and also any further wastewaters 14 from the polymerization, an example being wastewater from reactor flushing, are preferably also supplied to the wastewater degassing unit 12. There they are applied to the rectifying column 24.

Within the wastewater degassing unit AWEGA 12, the collected condensates and wastewaters 21 are separated, in the rectifying column 24, into a liquid phase 30 largely freed from organic impurities (purified wastewater), and into a distillate phase 34 containing predominantly vinyl acetate. The vinyl acetate monomer 34 is preferably returned to the polymerization. The purified wastewater 30 can be disposed of without further processing.

The wastewater degassing unit AWEGA 12 and preferred embodiments for the purification of the wastewater are elucidated in more detail in FIG. 2:

The collected wastewaters 21 are fed, for the purpose of recovering the vinyl acetate monomer fraction, to the top of the rectifying column 24, which is operated preferably under a pressure of 0.2 to 0.5 bar abs. and at a temperature of 40 to 60° C. The wastewater 21, which has a temperature of generally 20 to 30° C., is preferably preheated to a temperature of preferably 50 to 60° C., and the preheated condensate 23 is applied to the rectifying column 24. This may be done by means of indirect heat exchange in a heat exchanger 22, with possible heat transfer media being steam, heat-transfer oil, and preferably the purified wastewater 29 obtained following recovery of the vinyl acetate monomer fraction.

A stream 31 in vapor form is taken off at the top of the rectifying column 24 and cooled in a condenser 32 to a temperature at which the water fraction condenses, preferably to a temperature of 30 to 40° C. under a pressure of preferably 0.2 to 0.4 bar abs. The water-enriched condensate 33 obtained in this process is applied as a return flow to the top of the rectifying column 24 again.

The gaseous fraction 34, with up to 98 wt %, preferably 85 to 95 wt %, of vinyl acetate, generally 1 to 14 wt % of steam, and generally 0.5 to 1 wt % of acetaldehyde, can be returned to the polymerization in liquid form after preferably complete condensation in the heat exchanger 35, in order to re-use the vinyl acetate fraction in the polymerization, or can be passed to incineration, or, in the most preferred embodiment, can be purified further.

The bottom product 25 from the rectifying column is the purified wastewater, with a purity of preferably ≥99.0 wt % water, more preferably ≥99.5 wt % water.

In a preferred embodiment, the bottom product (wastewater) 25 may be purified further. In another preferred embodiment, the vinyl acetate monomer 34 may be purified further.

For the further purification of the wastewater, the bottom product 25 is supplied to a vaporizer 27. In the vaporizer 27, the vapor stream 28 which can be used for the countercurrent stream in the rectifying column 24 is generated by means of partial vaporization of the bottom product 25, preferably by means of heating 26 (direct or indirect heating with steam). In the case of partial vaporization, generally 0.5 to 10 wt %, preferably 1 to 5 wt %, based on the bottom product 25, is vaporized. The wastewater stream 29 which remains following partial vaporization is thereby freed additionally from residual monomers. Optionally after heat exchange in the heat exchanger 22 (for the preheating of the wastewater stream 21), purified wastewater 29/30, with a purity of preferably 99.9 wt % water, more preferably 99.95 wt % water, can be removed from the operation.

In another preferred embodiment, the top product 31 (vinyl acetate monomer) of the rectifying column 24 may be purified further. For this purpose, this product is condensed and purified in a further rectifying column 42. The top product 31, comprising low and middle boilers, especially vinyl acetate, is preferably removed via a condenser 32 and preferably cooled in a heat exchanger 35, preferably to a temperature of 10 to 20° C. under a pressure of preferably 0.2 to 0.5 bar abs. The condensate 36 obtained in this procedure is supplied to a liquid phase separator 37. The uncondensable gaseous fractions 38 are passed preferably to waste-gas incineration.

The liquid phase separator 37 may optionally also be supplied with condensates and wastewaters from other parts of the plant (condensate/wastewater stream 39), such as the wastewaters obtained during operation of a water-operated liquid ring compressor 5, the condensate from the waste-gas buffer vessel 6, or condensates obtained within the pipelines of the plant. The stated wastewaters of the wastewater stream 39 generally comprise a predominant fraction of organic constituents such as residual monomer or byproducts of the polymerization, and only 1 to 15 wt % of water. This incoming stream is divided in the liquid phase separator 37 into an aqueous phase 40, which is preferably recycled to the top of the rectifying column 24, and a vinyl acetate monomer phase 41.

The vinyl acetate monomer phase 41 can be returned to the polymerization without further treatment or may be freed from relatively low-boiling organic byproducts 43, acetaldehyde for example, in a further rectifying column 42, before being returned to the polymerization. The rectifying column 42 is operated preferably under a pressure of 0.2 to 0.5 bar abs. and at a temperature of 30 to 40° C. The organic phase 43 in vapor form is taken off at the top of the column 42, and cooled in the heat exchanger 35, and the uncondensable gaseous fractions 38 are passed to waste-gas incineration. The purified vinyl acetate monomer 44 is taken from the column bottoms.

The method of the invention can be used to bring the wastewaters from a polymerization of vinyl acetate and ethylene, containing in unpurified form 1.5 to 2.0% of vinyl acetate monomer, to a purity of preferably ≥99.9 wt % water, with the remaining VAM fraction being preferably just 200 to 300 ppm.

The vinyl acetate monomer (VAM) 34 is obtained at the top of the rectifying column 24, following removal of the water fraction by condensation in the condenser 32, with a purity of preferably 85% VAM.

In the preferred embodiment it is possible, by means of a second rectifying column 42, to bring the vinyl acetate monomer 44 to a purity of preferably 99% VAM.

The examples which follow serve for further elucidation of the invention:

EXAMPLE 1

In an industrial plant for the production of aqueous vinyl acetate-ethylene copolymer dispersions, with a capacity of 100,000 metric tons of polymer dispersion per year, the same time period saw around 40,000 m³ of wastewater being obtained (0.4 m³ of wastewater per metric ton of dispersion). The average composition of this wastewater was as follows: 1.5 wt % vinyl acetate, 400 wt-ppm acetaldehyde, 20 wt-ppm tert-butanol, and 10 wt-ppm ethyl acetate.

The primary components of this wastewater were the fractions obtained as condensates during letdown in the water-operated liquid ring compressor 5 (stream 7) and the fractions obtained after stripping and cooling in the heat exchanger unit 8 (stream 11).

The wastewater was heated to 55° C. by injection of saturated steam, and applied to a rectifying column (column 24) (top pressure 295 mbar abs.; column-top temperature 53° C.; number of theoretical plates: 4; reflux condensation at 40° C.)

Wastewater with the following purity was obtained as bottom product (25):
2000 ppm vinyl acetate, 735 ppm acetaldehyde, 32 ppm tert-butanol, 16 ppm ethyl acetate.

Following partial vaporization, the purity of the wastewater stream (29) was as follows:
265 ppm vinyl acetate, 290 ppm acetaldehyde, 18 ppm tert-butanol, and 4 ppm ethyl acetate.

Obtained at the top of the column was a distillate (31/34) having the following composition: 89 wt % vinyl acetate, 7 wt % water, 0.9 wt % acetaldehyde, 120 ppm tert-butanol, 376 ppm ethyl acetate.

With this procedure it was possible to recover approximately 400 metric tons of vinyl acetate monomer per annum, in the form of the distillate (31/34).

EXAMPLE 2

The procedure was analogous to that of example 1, with the distillate recovered as per example 1 being worked up in a further rectifying column (column 42), this column also being fed with condensates from the pipelines of the plant, from the liquid ring compressor, and from the waste-gas buffer vessel (wastewater stream 39: 86 wt % vinyl acetate, 10.6 wt % water, 0.7 wt % acetaldehyde, 0.4 wt % tert-butanol). The operating data for this rectifying column were as follows: column-top pressure 300 mbar abs; column-top temperature 30° C.; number of theoretical plates: 15; reflux condensation at 20° C. The bottom product of the column (VAM) had the following composition: 99.4 wt % vinyl acetate, 0.4 wt % water, 45 ppm acetaldehyde, 980 ppm tert-butanol, 710 ppm ethyl acetate.

With this procedure it was possible to recover a further 250 metric tons of vinyl acetate monomer, in addition to the 400 metric tons of vinyl acetate monomer per annum as per example 1.

This corresponds to a saving of approximately € 650,000 per annum for a plant capacity of 100,000 metric tons of dispersion per annum.

The invention claimed is:

1. A method for processing wastewaters and waste-gas condensates from the polymerization of vinyl acetate and ethylene and optionally further comonomers in an aqueous medium, by a suspension or emulsion polymerization process under a pressure of 5 to 100 bar abs., in which, after the end of the polymerization, the polymerization batch is let down to a pressure of 0.1 to 5 bar abs. and a first gaseous phase is taken off, and is optionally treated with inert entraining gases (stripping) and the polymer dispersion and a second gaseous phase is drained off, wherein
   A) during letdown the first gaseous phase is taken off by means of a compressor,
   B) the second gaseous phase optionally obtained during stripping is taken off by means of the compressor and, before entering the compressor, is cooled by means of one or more heat exchangers, and
   C) liquid phases obtained in the compressor and optionally in the heat exchanger are each separated from at least one of the first and second gaseous phases, and
   D) the liquid phases are applied to a rectifying column, and are separated into a vinyl acetate monomer phase and into a wastewater phase, and the vinyl acetate monomer phase is returned to the polymerization,
   wherein the wastewater obtained as bottom product in the rectifying column is purified further, and for that purpose is partially vaporized in a vaporizer, and the wastewater stream which remains after partial vaporization is removed.

2. The method of claim 1, wherein the condensates obtained during compression and the wastewaters obtained during operation of the compressor, and also any further wastewaters from the polymerization, are collected and applied to the rectifying column.

3. The method of claim 1, wherein a vinyl acetate monomer stream in vapor form is taken off at the top of the rectifying column and is cooled to a temperature at which a water fraction condenses, and the gaseous vinyl acetate monomer fraction, optionally after condensation, is returned to the polymerization or passed to waste-gas incineration.

4. The method of claim 1, wherein the purified wastewater is taken as bottom product from the rectifying column.

5. The method of claim 1, wherein the vinyl acetate monomer stream in vapor form that is taken off at the top of the rectifying column is purified in a further rectifying column.

6. The method of claim 5, wherein the further rectifying column is supplied with further wastewaters having predominantly organic constituents.

* * * * *